United States Patent [19]

Shiraiwa

[11] Patent Number: 5,571,472
[45] Date of Patent: Nov. 5, 1996

[54] METHOD OF IMPROVING THE ELECTRICAL CONDUCTIVITY OF SHAPED RESIN ARTICLES AND AN ELECTROSTATIC COATING PROCESS

[75] Inventor: Tetsuo Shiraiwa, Osaka, Japan

[73] Assignee: Dai-Ichi Kogyo Seiyaku Co., Ltd., Kyoto, Japan

[21] Appl. No.: 408,324

[22] Filed: Mar. 21, 1995

[30] Foreign Application Priority Data

Mar. 30, 1994 [JP] Japan .................................. 6-060801
Mar. 31, 1994 [JP] Japan .................................. 6-062228

[51] Int. Cl.$^6$ .................................................. B29C 35/08
[52] U.S. Cl. .................. 264/439; 264/446; 264/469; 264/478; 264/483; 264/104; 264/131; 427/491; 427/536; 425/174.8 E
[58] Field of Search ........................ 264/22, 24, 104, 264/131, 438–440, 446, 469, 483, 478; 425/174.8 E; 427/536, 491

[56] References Cited

U.S. PATENT DOCUMENTS

| | | | |
|---|---|---|---|
| 3,478,387 | 11/1969 | Ruekberg | 425/174.8 E |
| 3,930,061 | 12/1975 | Scharfenberger | 264/24 |
| 4,317,788 | 3/1982 | Imada et al. | 264/83 |
| 4,664,856 | 5/1987 | Talbott et al. | 264/24 |
| 4,675,143 | 6/1987 | Wakita et al. | 264/104 |
| 5,089,199 | 2/1992 | Fujiwara et al. | 264/83 |
| 5,137,748 | 8/1992 | Fujiwara et al. | 427/407.1 |
| 5,188,783 | 2/1993 | Pierce | 264/104 |
| 5,206,273 | 4/1993 | Chen et al. | |
| 5,439,628 | 8/1995 | Huang | 264/211 |

FOREIGN PATENT DOCUMENTS

| | | |
|---|---|---|
| 0418067A2 | 3/1991 | European Pat. Off. . |
| 0418066A2 | 3/1991 | European Pat. Off. . |
| 5066538 | 6/1975 | Japan . |
| 3101874 | 4/1991 | Japan . |
| 3101875 | 4/1991 | Japan . |

OTHER PUBLICATIONS

Database WPI–Section Ch, Week 8645 Derwent Publications Ltd., London, GB; Class A17, AN 86–295792 & JP–A–61 218 649 (Mitsui Petrochem Ind KK), 29 Sep. 1986–abstract.

Database WPI–Section Ch, Week 8211 Derwent Publications Ltd., London, GB; Class A17, AN 82–20494E & JP–A–57 021 433 (Tokuyama Soda KK), 4 Feb. 1982–abstract.

*Primary Examiner*—Jeffery R. Thurlow
*Attorney, Agent, or Firm*—Jordan and Hamburg

[57] ABSTRACT

A nitrogen-containing compound of the following general formula (1) is kneaded into a resin molding material, the kneaded mixture is molded, and the surface of the resulting article is subjected to corona discharge treatment. Then, an electrostatically charged coating is sprayed on the article.

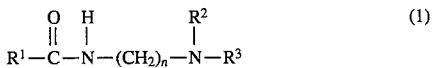

wherein $R^1$ represents an alkyl group of 6–22 carbon atoms, $R^2$ and $R^3$ may be the same or different and each represents an alkyl group of 1–4 carbon atoms; n represents 2–3. In accordance with this invention, a shaped resin article with remarkably improved electrical conductivity can be obtained from a resin of low electrical conductivity substantially without affecting the physical properties and color of the resin and with high productivity. Furthermore, a resin article with high surface resistivity can be electrostatically coated with high coating efficiency and improved results in appearance and productivity substantially without affecting the physical properties of the resin.

2 Claims, No Drawings

METHOD OF IMPROVING THE ELECTRICAL CONDUCTIVITY OF SHAPED RESIN ARTICLES AND AN ELECTROSTATIC COATING PROCESS

BACKGROUND OF THE INVENTION

This invention relates to a method of improving the electrical conductivity of a shaped resin article and an electrostatic coating process.

The hitherto-known technology for improving the electrical conductivity of a shaped resin article includes a method which comprises kneading carbon black, carbon fiber, conductive mica or the like into the molding resin.

However, in this prior art method for improving the electrical conductivity of a resin article, no appreciable improvement in electrical conductivity can be expected unless an electrically conductive additive such as carbon black is incorporated in a large amount, with the result that the final resin product is inevitably handicapped in physical properties. Black coloration is another disadvantage restricting the scope of application of the method.

Recently disclosed is a method in which a complex of a polyoxyalkylene polyol with an electrolyte salt soluble in the polyol is kneaded into a resin molding material and, after molding into a shaped article, the surface of the article is subjected to plasma treatment (Japanese Kokai Patent Publication No. 3-101874). However, this method has the disadvantage of low productivity because of its being a batch process, as well as the disadvantage that the load must be subjected to reduced pressure during plasma treatment.

On the other hand, the conventional technology for electrostatic coating of a shaped resin article includes a method which, as described inter alia in Japanese Kokai Patent Publication No. 50-66538, comprises forming an electrically conductive primer layer on the surface of a resin article by, for example, coating said surface with a conductive paint containing an electrically conductive metal powder to impart electrical conductivity to the surface and, then, performing electrostatic coating. Another known method in this field of the art comprises kneading an electrically conductive inorganic substance such as carbon black, carbon fiber, conductive mica or the like into a resin molding material and, after molding, performing electrostatic coating.

However, when an electrically conductive primer layer is deposited on the surface of a shaped resin article, as taught by Japanese Kokai Patent Publication No. 50-66538, only poor adhesion is assured between the resin surface and the primer so that a plurality of different electrically conductive primers must be deposited in a plurality of layers to overcome the disadvantage. This practice is not only disadvantageous with respect to electrical conductivity and productivity, but the use of different kinds of electrically conductive primers leads to coating wastes and increased costs of production.

Furthermore, when electrostatic coating is performed on an article containing an electrically conductive inorganic substance such as carbon black, carbon fiber, conductive mica or the like, the conductive substance must be used in a large amount and this tends to detract from the physical properties of the resin article. Moreover, the resulting coloration of the resin affects the surface color tone of the electrostatically coated article.

More recently disclosed is a method in which a complex of a polyoxyalkylene polyol with a soluble electrolyte salt is kneaded into a resin molding material, the kneaded mixture is molded, and the surface of the article so produced is subjected to plasma treatment and, then, to electrostatic coating (Japanese Kokai Patent Publication No. 3-101875). However, because the plasma treatment is a batch operation, the method is low in productivity. Moreover, the plasma treatment must be performed under reduced pressure.

SUMMARY OF THE INVENTION

An object of this invention is to overcome the above disadvantages of the prior art and provide a method of improving the electrical conductivity of a shaped resin article resulting high productivity and without detracting from the physical properties of the resin or causing discoloration of the shaped article.

It is a further object of this invention to provide an electrostatic coating process which is free from the problems associated with physical properties and color of the resin article, provides for high coating and deposition efficiencies, and insures high productivity.

This invention relates to a method of improving the electrical conductivity of a shaped resin article characterized in that a nitrogen-containing compound of the following general formula (1) is kneaded into a resin molding material, the kneaded mixture is then molded, and the surface of the resulting article is subjected to corona discharge treatment.

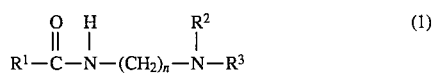

wherein $R^1$ represents an alkyl group of 6–22 carbon atoms, $R^2$ and $R^3$ may be the same or different and each represents an alkyl group of 1–4 carbon atoms; n represents 2–3.

In the process of this invention, the nitrogen-containing compound (1) present in the surface layer of the resin article is activated and partially quaternized by corona discharge. Therefore, a shaped resin article with remarkably improved electrical conductivity compared with the conventional article can be obtained and the productivity is also improved.

This invention further relates to an electrostatic coating process for a shaped resin article which comprises kneading a nitrogen-containing compound of the following general formula (1) into a resin molding material, molding the kneaded mixture, subjecting the surface of the resulting article to corona discharge treatment, and spraying the treated surface with an electrostatically charged coating.

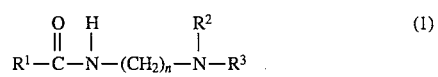

wherein $R^1$ represents an alkyl group of 6–22 carbon atoms, $R^2$ and $R^3$ may be the same or different and each represents an alkyl group of 1–4 carbon atoms; n represents 2–3.

In this process, the nitrogen-containing compound (1) present in the surface layer of the shaped resin article is activated and partially quaternized by corona discharge so that the surface resistivity of the article is lowered. As a synergistic effect of this reduced surface resistivity and surface modification due to corona discharge treatment, the surface of the article is made more receptive to electrostatic coating, thus providing for high coating and deposition efficiencies.

DETAILED DESCRIPTION OF THE PREFERRED EMBODIMENTS

The resin that can be used in this invention includes a variety of resins which provide for high surface resistivity values, such as polyolefin resins, e.g. polyethylene, polypropylene, rubber-containing polypropylene (containing an ethylene-propylene copolymer rubber), etc., ABS resin, acrylic resin, polyamide resin, polyvinyl chloride resin, polycarbonate resin, polyacetal resin, phenolic resin, and so on.

The nitrogen-containing compound of general formula (1) includes a variety of amides such as N,N-dimethylaminopropyloctylamide, N,N-diethylaminopropyloctylamide, N,N-diethylaminoethyloctylamide, N,N-dibutylaminopropyloctylamide, N,N-dibutylaminoethyloctylamide, N,N-dimethylaminopropyllaurylamide, N,N-diethylaminopropyllaurylamide, N-N-diethylaminoethyllaurylamide, N,N-dibutylaminopropyllaurylamide, N,N-dibutylaminoethyllaurylamide, N,N-dimethylaminopropylmyristylamide, N,N-diethylaminopropylmyristylamide, N,N-diethylaminoethylmyristylamide, N,N-dibutylaminopropylmyristylamide, N,N-dibutylaminoethylmyristylamide, N,N-dimethylaminopropylpalmitylamide, N,N-diethylaminopropylpalmitylamide, N,N-diethylaminoethylpalmitylamide, N,N-dibutylaminopropylpalmitylamide, N,N-dibutylaminoethylpalmitylamide, N,N-dimethylaminopropylstearylamide, N,N-diethylaminopropylstearylamide, N,N-diethylaminoethylstearylamide, N,N-dibutylaminopropylstearylamide, N,N-dibutylaminoethylstearylamide and so on.

These amides can be produced by reacting saturated fatty acids of 7-23 carbon atoms with an N,N-dialkylaminoalkylamine such as N,N-dimethylaminopropylamine, N,N-diethylaminopropylamine, N,N-diethylaminoethylamine, N,N-dibutylaminopropylamine, N,N-dibutylaminoethylamine, and so on. This reaction can be carried out by any known amidation reaction. Thus, this reaction proceeds as said reactants are heated together at a temperature of 140°–200° C. The progress of reaction can be monitored by determining the total amine value, tertiary amine value and acid value.

The proportion of the nitrogen-containing compound of the above general formula (1) based on 100 parts by weight of the resin molding material is 0.01–10 parts by weight, preferably 0.05–5 parts by weight and, for still better results, 0.1–3 parts by weight. Addition of an excess of compound (1) over 10 parts by weight is favorable to electrical conductivity but owing to a decrease in compatibility, the practice detracts from physical properties and causes surface bleeding, thus offering no remarkable merit. On the other hand, an addition level below 0.01 part by weight tends to result in poor electrical conductivity.

The amount of the nitrogen-containing compound of general formula (1) in the electrostatic coating process is also 0.01–10 parts by weight, preferably 0.05–5 parts by weight and, for still better results, 0.1–3 parts by weight based on 100 parts by weight of the resin molding material. Addition in excess of 10 parts by weight is conducive to increased electrical conductivity but a reduced compatibility detracts from the physical properties of the article and causes surface bleeding, with a potentially adverse influence on the electrostatically deposited coating film. On the other hand, an addition level of less than 0.01 part by weight tends to provide only a low electrical conductivity so that no enhancement of coating efficiency can be expected.

It should be understood that in the addition of the nitrogen-containing compound (1) by kneading it into the resin molding material, other additives such as antistatic agents, process stabilizers, etc. can be used in conjunction.

As the means for kneading the nitrogen-containing compound (1) into the resin molding material, any of the twin-screw extrusion, hot roll and other conventional methods can be utilized. With regard to the means of molding the resin, too, any of injection molding, calendering, compression molding, SMC and other methods can be employed.

For the corona discharge treatment, the corona generated at atmospheric pressure by application of a high voltage across two conductors with a high frequency power source is caused to contact the surface of the load (a shaped resin article). The treating conditions are not particularly critical, only if a corona discharge is induced. For example, the application voltage may be about 10–50 KV and the treating time may be not more than about 100 seconds.

Electrostatic coating can be performed by any known method, for example by means of an electric centrifugal air coating machine, an airless mist coating machine or the like. The application voltage is about −30 KV to about −120 KV. The coating material can be any conventional coating material such as urethane, acrylic, alkyd, melamine and other paints.

In accordance with this invention, a shaped resin article with remarkably improved electrical conductivity can be obtained from a resin of low electrical conductivity substantially without affecting the physical properties and color of the resin and with high productivity.

Furthermore, in accordance with this invention, a resin article with high surface resistivity can be electrostatically coated with high coating efficiency and improved results in appearance and productivity substantially without affecting the physical properties of the resin.

The following examples and comparative examples are intended to describe this invention in further detail and should by no means be construed as limiting the scope of the invention.

EXAMPLES 1–18

As shown in Table 1, a predetermined amount of a nitrogen-containing compound of general formula (1) was added to 1 kg of a resin molding material and using a twin-screw extruder the feed was kneaded at 180° C. for 10 minutes to provide pellets. Using an injection molding machine (Niigata Engineering Co., Hyper Shot), the pellets were molded to provide a shaped article measuring 230 mm×230 mm×3 mm. This article was subjected to corona discharge treatment (high frequency power source: Kasuga Denki; High-Frequency Power Supply HFS-203) at an application voltage of 30 KV for 20 seconds to prepare a testpiece. Immediately, the surface resistivity and tensile strength of this testpiece were determined. Surface resistivity was measured with YHP (Yokogawa-Hewlett Packard) Superinsulation Resistance Meter 4329A at an application voltage of 500 V at the time point of 30 seconds after voltage application (humidity 65%, temperature 20° C.). Tensile strength was measured in accordance with JIS K 7113.

Then, the above testpiece was grounded and electrostatically coated with an urethane paint (Nippon B Chemical, R-315) using a coating machine (Ransburg-Gema, μρBEL30φ) at a static voltage of −40 KV, a reciprocation stroke of 400 mm, a spray distance of 300 mm and a conveyor speed of 2.2 m/min. After 30 minutes' drying at 120° C., the coating film thickness and coating efficiency were determined.

The results are shown in Table 1.

COMPARATIVE EXAMPLES 1–8

The procedure of Examples 1–18 was repeated except that the processing parameters shown in Table 2 were used in lieu of the nitrogen-containing compound and corona discharge treatment.

The results are shown in Table 2.

It is apparent from Tables 1 and 2 that this invention is superior to the prior art in the physical properties and electrical conductivity of a shaped resin article and in coating efficiency and the physical properties of the coated article.

TABLE 1

| | Nitrogen-containing compound of general formula (1) | Level of addition g (wt. parts) *1 | Resin molding material *2 | Corona discharge treatment | Surface resistivity (Ω) | Tensile strength (kg/cm$^2$) | Film thickness (μm) *3 | Coating efficiency (%) *4 |
|---|---|---|---|---|---|---|---|---|
| Example 1 | N,N-Dimethylaminopropyloctylamide | 10 (1) | PP-1 | YES | $5.4 \times 10^{10}$ | 319 | 36 | 81 |
| Example 2 | N,N-Dimethylaminopropyllaurylamide | 10 (1) | PP-1 | YES | $3.1 \times 10^{10}$ | 322 | 35 | 83 |
| Example 3 | N,N-Dimethylaminopropylmyristylamide | 10 (1) | PP-1 | YES | $8.2 \times 10^{10}$ | 323 | 33 | 79 |
| Example 4 | N,N-Dimethylaminopropylpalmitylamide | 10 (1) | PP-1 | YES | $9.3 \times 10^{10}$ | 324 | 32 | 78 |
| Example 5 | N,N-Dimethylaminopropylstearylamide | 10 (1) | PP-1 | YES | $1.1 \times 10^{10}$ | 326 | 34 | 77 |
| Example 6 | N,N-Dimethylaminoethyloctylamide | 10 (1) | PP-1 | YES | $6.6 \times 10^{10}$ | 320 | 32 | 80 |
| Example 7 | N,N-Diethylaminopropylmyristylamide | 10 (1) | PP-1 | YES | $9.0 \times 10^{10}$ | 322 | 31 | 78 |
| Example 8 | N,N-Dibutylaminopropylmyristylamide | 10 (1) | PP-1 | YES | $1.0 \times 10^{11}$ | 321 | 33 | 77 |
| Example 9 | N,N-Diethylaminoethylmyristylamide | 10 (1) | PP-1 | YES | $9.1 \times 10^{10}$ | 324 | 31 | 78 |
| Example 10 | N,N-Dibutylaminoethylmyristylamide | 10 (1) | PP-1 | YES | $1.2 \times 10^{11}$ | 322 | 32 | 77 |
| Example 11 | N,N-Diethylaminopropyllaurylamide | 10 (1) | PP-1 | YES | $5.2 \times 10^{11}$ | 321 | 34 | 81 |
| Example 12 | N,N-Dimethylaminopropyllaurylamide | 0.3 (0.03) | PP-1 | YES | $7.9 \times 10^{11}$ | 329 | 31 | 75 |
| Example 13 | N,N-Dimethylaminopropyllaurylamide | 0.8 (0.08) | PP-1 | YES | $5.1 \times 10^{11}$ | 327 | 31 | 76 |
| Example 14 | N,N-Dimethylaminopropylstearylamide | 40 (4) | PP-1 | YES | $7.8 \times 10^{10}$ | 316 | 37 | 80 |
| Example 15 | N,N-Dimethylaminopropylstearylamide | 80 (8) | PP-1 | YES | $4.3 \times 10^{10}$ | 311 | 38 | 82 |
| Example 16 | N,N-Dimethylaminopropylmyristylamide | 10 (1) | PP-2 | YES | $9.1 \times 10^{10}$ | 221 | 31 | 78 |
| Example 17 | N,N-Dimethylaminopropylmyristylamide | 15 (1.5) | PE | YES | $6.2 \times 10^{10}$ | 152 | 32 | 81 |
| Example 18 | N,N-Dimethylaminopropylmyristylamide | 15 (1.5) | ABS | YES | $5.8 \times 10^{10}$ | 406 | 34 | 82 |

*1: The figure in parentheses denotes the amount, in parts by weight, of the nitrogen-containing compound based on 100 parts by weight of the resin molding material.
*2: PP-1 (polypropylene resin, manufactured by Union Polymer, ME230) PP-2 (polypropylene resin, manufactured by Idemitsu Petrochemicals, Idemitsu Polypropylene J-465H) PE (polyethylene resin, manufactured by Dia Polymer, Mitsubishi Polyethylene LDZF-51) ABS (ABS resin, manufactured by Ube Cycone, Cycolac T)
*3: Film thickness was visually estimated by microscopic observation of the cross-section of the testpiece.
*4: Coating efficiency was determined from the difference between the weight before coating and the weight after coating and the absolute weight of the dispensed coating by means of the following equation. Coating efficiency (%) = (the weight of the testpiece after coating − the weight of the testpiece before coating) ÷ the absolute weight of the dispensed coating × 100

TABLE 2

| | Nitrogen-containing compound of general formula (1) | Level of addition g (wt. parts) *1 | Resin molding material *2 | Corona discharge treatment | Surface resistivity (Ω) | Tensile strength (kg/cm$^2$) | Film thickness (μm) *3 | Coating efficiency (%) *4 |
|---|---|---|---|---|---|---|---|---|
| Comparative Example 1 | None | 0 | PP-1 | YES | $2.1 \times 10^{16}$ | 330 | 8 | 25 |
| Comparative Example 2 | N,N-Dimethylaminopropylmyristylamide | 10 (1) | PP-1 | NO | $1.8 \times 10^{16}$ | 321 | 7 | 23 |
| Comparative Example 3 | None | 0 | PP-2 | YES | $3.1 \times 10^{16}$ | 231 | 7 | 23 |
| Comparative Example 4 | N,N-Dimethylaminopropylmyristylamide | 10 (1) | PP-2 | NO | $2.8 \times 10^{16}$ | 221 | 8 | 25 |

TABLE 2-continued

| | Nitrogen-containing compound of general formula (1) | Level of addition g (wt. parts) *1 | Resin molding material *2 | Corona discharge treatment | Surface resistivity (Ω) | Tensile strength (kg/cm²) | Film thickness (μm) *3 | Coating efficiency (%) *4 |
|---|---|---|---|---|---|---|---|---|
| Comparative Example 5 | None | 0 | PE | YES | $1.7 \times 10^{16}$ | 162 | 9 | 26 |
| Comparative Example 6 | N,N-Dimethylamino-propylmyristylamide | 10 (1) | PE | NO | $1.6 \times 10^{16}$ | 152 | 8 | 25 |
| Comparative Example 7 | None | 0 | ABS | YES | $2.4 \times 10^{16}$ | 410 | 9 | 26 |
| Comparative Example 8 | N,N-Dimethylamino-propylmyristylamide | 10 (1) | ABS | NO | $2.1 \times 10^{16}$ | 404 | 7 | 23 |

*1, *2, *3, *4: Same as Table 1

What is claimed is:

1. A method of improving the electrical conductivity of a shaped resin article which comprises kneading a nitrogen-containing compound of the following general formula (1) into a resin molding material, molding the kneaded mixture and subjecting the surface of the resulting article to corona discharge treatment:

$$R^1-\overset{O}{\underset{\|}{C}}-\overset{H}{\underset{|}{N}}-(CH_2)_n-\overset{R^2}{\underset{|}{N}}-R^3 \quad (1)$$

wherein R1 represents an alkyl group of 6–22 carbon atoms, R2 and R3 may be the same or different and each represents an alkyl group of 1–4 carbon atoms; n represents 2–3;

said nitrogen-containing compound of general formula (1) being used in a proportion of 0.01–10 parts by weight based on 100 parts by weight of said resin molding material.

2. An electrostatic coating process which comprises kneading a nitrogen-containing compound of the following general formula (1) into a resin molding material, molding the kneaded mixture, subjecting the surface of the resulting article to corona discharge treatment and spraying the thus-treated surface of the article with an electrostatically charged coating:

$$R^1-\overset{O}{\underset{\|}{C}}-\overset{H}{\underset{|}{N}}-(CH_2)_n-\overset{R^2}{\underset{|}{N}}-R^3 \quad (1)$$

wherein R1 represents an alkyl group of 6–22 carbon atoms, R2 and R3 may be the same or different and each represents an alkyl group of 1–4 carbon atoms; n represents 2–3;

said nitrogen-containing compound of general formula (1) being used in a proportion of 0.01–10 parts by weight based on 100 parts by weight of said resin molding material.

* * * * *